United States Patent [19]

Giuffrida

[11] Patent Number: 4,931,160
[45] Date of Patent: Jun. 5, 1990

[54] ELECTRODEIONIZATION METHOD AND APPARATUS

[75] Inventor: Anthony J. Giuffrida, North Andover, Mass.

[73] Assignee: Millipore Corporation, Bedford, Mass.

[21] Appl. No.: 275,314

[22] Filed: Nov. 23, 1988

Related U.S. Application Data

[63] Continuation of Ser. No. 48,161, May 11, 1987, abandoned.

[51] Int. Cl.$^5$ .................. B01D 61/46; B01D 61/48; B01D 61/50; B01D 61/58
[52] U.S. Cl. ........................... 204/301; 204/182.4; 204/182.5
[58] Field of Search ............... 204/301, 182.3, 182.4, 204/182.5, 182.6

[56] References Cited

U.S. PATENT DOCUMENTS

| | | | |
|---|---|---|---|
| 2,799,644 | 5/1957 | Kollsman | 204/182.5 X |
| 2,923,679 | 2/1960 | Kressman | 204/182.4 |
| 3,014,855 | 12/1961 | Kressman | 204/182.4 |
| 3,149,061 | 9/1964 | Parsi | 204/182.4 |
| 3,291,713 | 12/1966 | Parsi | 204/182.5 |
| 4,439,967 | 3/1984 | Sanchez et al. | 204/301 |
| 4,632,745 | 12/1986 | Giuffrida et al. | 204/301 |

*Primary Examiner*—John F. Niebling
*Assistant Examiner*—John S. Starsiak, Jr.
*Attorney, Agent, or Firm*—Andrew T. Karnakis; Paul J. Cook

[57] ABSTRACT

An electrodeionization apparatus is provided for removing ions from liquids. Liquid to be purified is passed through at least two ion depletion compartments containing mixed anion and cation exchange resin beads in a given separation stage. A second liquid is passed through concentration compartments free of ion exchange resin beads. Ions under the influence of D.C. potential pass from the depletion compartments into the concentration compartments through ion permeable membranes. The beads in the depletion compartments are housed within subcompartments of controlled width and thickness and are retained therein by the ion permeable membranes which are secured to the walls of the subcompartments.

10 Claims, 6 Drawing Sheets

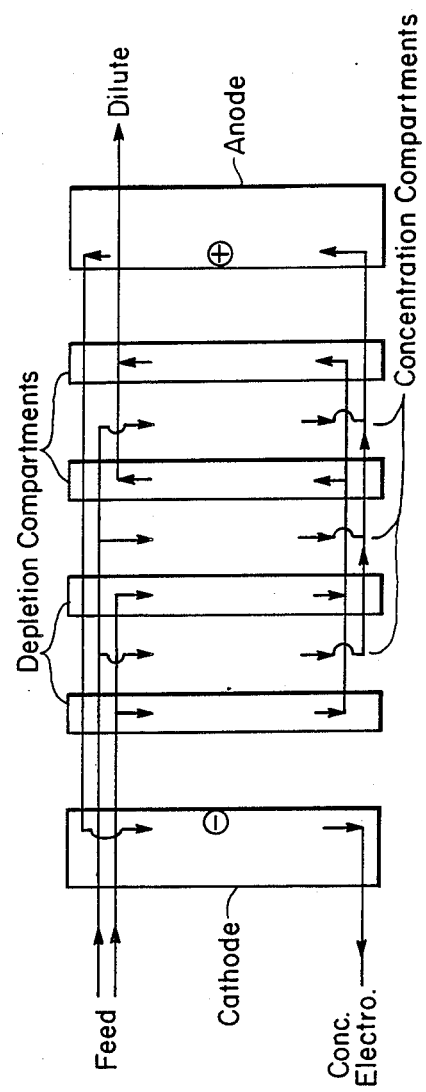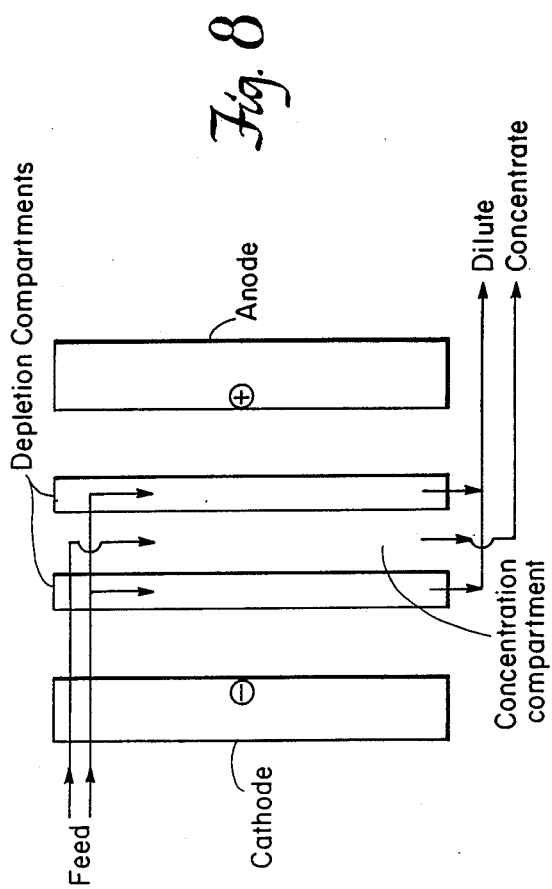

ELECTRODEIONIZATION METHOD AND APPARATUS

This is a continuation of co-pending application Ser. No. 048,161 filed on May 11, 1987, now abandoned.

BACKGROUND OF THE INVENTION

This invention relates to a novel electrodeionization apparatus and method adapted to transfer ions in a liquid under the influence of a polar field. More specifically, this invention relates to an electrodeionization apparatus and method adapted to purify aqueous liquids to effect the production of high purity water.

The purification of a liquid by reducing the concentration of ions or molecules in the liquid has been an area of substantial technological interest. Many techniques have been used to purify and isolate liquids or to obtain concentrated pools of specific ions or molecules from a liquid mixture. The most well known processes include electrodialysis, liquid chromatography, membrane filtration and ion exchange. A lesser known methodology is electrodeionization, occasionally mistermed filled cell electrodialysis. Although electrodeionization has the potential to be quite effective in removing ions from liquid, it has never been developed to the degree that it is competitive either structurally or operationally with the better known separation techniques. This is due primarily to the inconsistencies of structural design and unpredictable variances incurred by the presently known modes of use. This lack of structural design precision and nonpredictability of results have reduced the use of electrodeionization to the point where it is relatively unknown even to practitioners skilled in separation methodologies.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depleting chamber through a series of anionic and cationic diaphragms into a second volume of liquid in a concentration chamber under the influence of an electrical potential which causes the preselected ions to travel in a predetermined direction. The volume of the liquid being treated is depleted of ions while the volume of the second liquid becomes enriched with the transferred ions and carries them in concentrated form. The second of these patents describes the use of macroporous beads formed of ion exchange resins as a filler material positioned between the anionic or cationic diaphragms. This ion exchange resin acts as a path for ion transfer and also serves as an increased conductivity bridge between the membranes for the movement of ions. These patents represent the primary structural framework and theory of electrodeionization as a technique. The term electrodeionization refers to the process wherein an ion exchange material is positioned between the anionic and cationic diaphragms. The term electrodialysis relates to such a process which does not utilize ion exchange resins between the anionic and cationic diaphragms. Despite the fact that the Kollsman techniques has been available for over 25 years, this technology has not been developed even to the point of practical use. This is due in no small part to the lack of structural designs and the unavailability of operational mode parameters which afford reliable operation of the electrodeionization apparatus. Illustrative of prior art attempts to use the combination of electrodialysis and ion exchange materials to resins to purify saline from brackish water are described in U.S. Pat. Nos. 2,794,777; 2,796,395; 2,947,688; 3,384,568 and 4,165,273. Attempts to improve electrodeionization apparatus are shown in U.S. Pat. Nos. 3,149,061; 3,291,713; 3,515,664; 3,562,139; 3,993,517 and 4,284,492.

Despite the contributions represented by these patents, this prior art has not produced reliable electrodeionization apparatus. This typical resin fouling and membrane scaling problems of electrodeionization remain unalleviated. These electrodeionization apparatus remain unsuitable for desalination or for the production of high purity water. Hard waters, silica-containing waters and highly saline brackish waters, and waters containing colloidal particles and foulants still represent liquids that cannot be consistently and reliably purified by presently known electrodeionization apparatus and modes of operation. Extensive maintenance and cleaning of these apparatus remain necessary, the quality and volume of the purified liquids remain erratic and the ability to product at least 1 meg-ohm centimeter quality water consistently and in sufficient volume remain unachieved.

U.S. Pat. No. 4,632,745 describes an electrodeionization apparatus depletion compartments divided into subcompartments having a width between 0.3 and 4 inches and a thickness between 0.05 and 0.25 inch. It was found that when utilizing this apparatus, efficient ion removal from the depletion compartment is attained while requiring only low energy and while avoiding channeling.

The electrodeionization apparatus of U.S. Pat. No. 4,632,745 can employ one or more, e.g. two hydraulic stages with two separate independent electrical stages. An hydraulic stage comprises a given number, e.g. 30, of cell pairs in which a volume of water flows through. A cell pair comprises a cation and anion membrane which are bonded to a dilute spacer containing ion exchange resin as well as a concentrate spacer. An electrical stage comprises one anode and one cathode electrode which enclose the hydraulic stage. A one-stage stack design is employed for low salinity feed water, whereas a two-stage stack design can be employed for high salinity water. The purpose of a two-stage design is to obtain the maximum salt removal in the first stage without inducing polarization which is an inefficiency resulting in stream pH shifts. The upward pH shift of the concentrate stream will result in scaling if calcium or magnesium ions are present in the feed water to the stack. Maximum salt removal in the first stage without inducing polarization is about 80 percent. The product water from the first stage is fed into the second stage where the remaining salt (about 20%) is removed to obtain meg-ohm product quality. The water bring deionized is passed between each cell pair only once without changing flow direction. The overall design guards against scaling in the first stage while optimizing the overall salt removal, membrane utilization and energy requirement. In comparison, electrodialysis cannot product meg-ohm quality water because it is inefficient in the low salinity range and requires more membrane area and energy. It would be desirable to provide an electrodeionization apparatus and method which provides improved ion removal efficiency as compared to presently available apparatus.

SUMMARY OF THE INVENTION

The present invention provides an electrodeionization method and apparatus for producing purified water of up to 10 meg-ohm centimeter quality or higher over long time periods while avoiding serious reduction of ion exchange resin performance and avoiding the formation of particulates and scale within the electrodeionization apparatus. The electrodeionization apparatus includes a plurality of electrodeionization compartments whose thickness, width and configuration are controlled and which contain ion exchange materials such as beads, fibers or the like. The electrodeionization ion depleting compartments wherein liquid is depleted of ions are formed from a spacer having a hollow central portion divided by ribs or the like to define subcompartments. The ion exchange resin beads within the subcompartments are retained in the subcompartments by bonding or physically restraining a cationic permeable membrane to one surface of the depleting compartments and to the ribs and bonding or physically restraining an anionic permeable membrane to the opposing surface of the depleting compartment to the ribs, thereby to define the subcompartments. The concentration compartments into which ions migrate from the depleting compartments are free of ion exchange beads. The electrodeionization apparatus can comprise a single stage or a plurality of stages in series wherein the process voltage can be controlled independently in each stage, if desired. The ion depleting compartments and the concentration compartments in each stage are positioned between an anode and a cathode. Each stage contains at least one pair of ion depleting compartments. The water to be purified passes through at least two depletion compartments in each stage. Improved efficiency in removing ions from the water to be purified is attained by employing multiple passes within a single stage as compared to utilizing a single pass of a length equal to that of the sum of the length of the multiple passes within each stage.

BRIEF DESCRIPTION OF THE DRAWING

FIG. 8 is a schematic diagram of one method describe in Example 1.

FIG. 9 is a schematic diagram of a second method described in Example 1.

DETAILED DESCRIPTION OF SPECIFIC EMBODIMENTS

Figure 1:
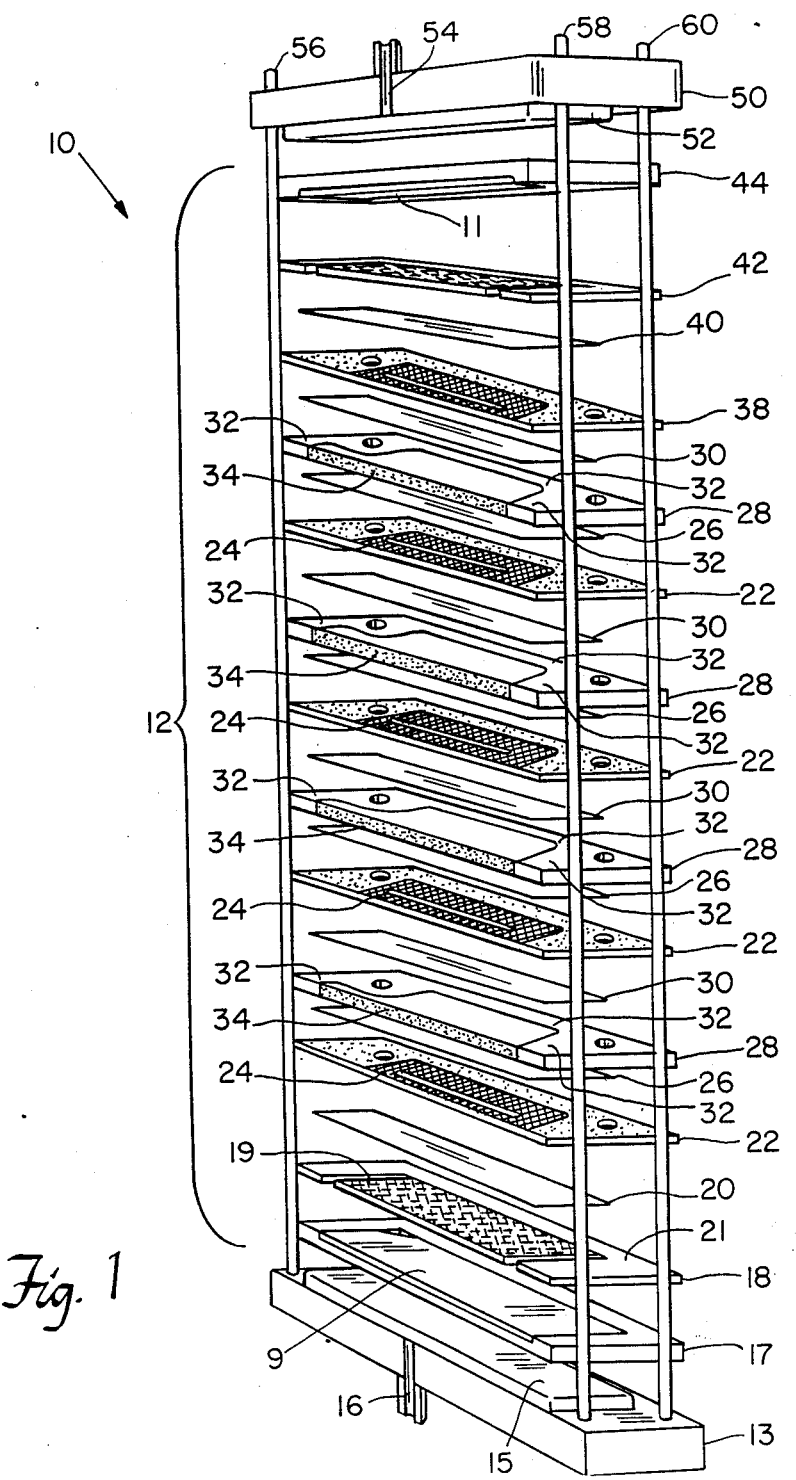
FIG. 1 is an exploded view of an electrodeionization apparatus of this invention.

In accordance with this invention, an electrodeionization apparatus is provided wherein each electrodeionization electrical stage includes an anode and a cathode, and their compartments, a series of concentration compartments and a series of depletion compartments that contain an ion exchange material such as a mixture of anion exchange resin and cation exchange resin. The depletion compartments are arranged and are provided with inlet and outlet means so that water to be purified is passed through at least two depletion compartments between a given set of anode and a cathode in each stage. Improved ion removal efficiency is attained with the multiple pass process of this invention as compared to a process wherein water to be purified is passed through one depletion compartment in each stage having a length equal to the combined lengths of the multi depletion compartments in each stage. The depletion compartments are formed so that the ion exchange resin mixture is housed within independent discrete subcompartments each of which has a width of about four inches or less, preferably between about 0.5 and about 1.5 inches. The discrete subcompartments are formed by securing, such as by bonding both the anion permeable membrane and the cation permeable membrane to the periphery of the depletion compartment and to ribs which extend across the thickness of and along the entire length of the depletion compartment so that each subcompartment is defined by a pair of ribs, the anion permeable exchange membrane and the cation permeable membrane. It has been found, in accordance with this invention that the thickness and width of the depletion compartments are critical to achieving efficient operation of the electrodeionization apparatus. The solid ion exchange material positioned within the subcompartments are constrained from moving between subcompartments by the ribs and ion permeable membranes. Representative suitable solid ion exchange materials include fibers or beads or the like. When employing ion exchange beads, typical bead diameter is about 0.04 inches or less, preferably between about 0.033 and about 0.012 inches in diameter (20 to 50 mesh).

The electrodeionization apparatus can comprise one or a plurality of stages. In each stage, an anode is positioned at an opposite end of a stack of depleting and concentrating compartments from an end at which a cathode is positioned at an opposite end of a stack of depleting and concentrating compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentrating compartments constructed as set forth herein. The liquid to be depleted of ions can be passed in parallel through each depleting compartment in each stage in order to effect removal of ions from the first liquid in the depleting compartments into the second liquid in the concentrating compartments. In any event the liquid to be purified must be passed through at least two depletion compartments in each stage. The direction of flow within the depletion compartments is not critical and can be in the same direction or in an opposite direction to the flow in an adjacent compartment or concentration compartment. When a plurality of stages are utilized, the liquid removed for the depleting compartments in an upstream stage can be directed in series into the depleting compartments in the next adjacent downstream stage. Alternatively, feed water can be directed in a counter flow arrangement in depleting compartments comprising a second stage. Electrolyte can be passed through the spacer adjacent each electrode in the electrodeionization apparatus and is removed from the electrodeionization apparatus.

As stated above it is essential that the subcompartment in the depleting compartments have a controlled thickness and width in order to sustain high efficiency for ion depletion over long periods. The thickness of the subcompartment should be between about 0.25 and about 0.05 inches, preferably between about 0.06 and 0.125 inches. The width of the subcompartment should be between about 0.3 and 4 inches, preferably between about 0.5 and about 1.5 inches. There is no limit on the length of the compartment other than as dictated by practical construction and fluid pressure loss condsiderations. Obviously, the longer the subcompartment length, the greater the ion removal from the liquid therein. Generally, the length of the subcompartments are between about 5 inches and about 70 inches. The subcompartments can contain 100% anion exchange material, 100% cation exchange material or a mixture of the two. When it is desired to remove only a particular anion or particular cation, 100% of the appropriate ion exchange material issued. Usually it is desired to remove both cations and anions in order to produce a purified liquid product. When utilizing strong acid-base resin materials such as beads, the ratio of anion exchange resin beads to cation exchange resin beads generally are about 60 to 40 by volume. By utilizing the subcompartment structure in the depleting compartments, efficient mixing of the liquid and the beads therein is attained while avoiding channeling of the liquid through the depleting compartments as well as avoiding compaction or movement of the beads within a portion of the volume of the depleting compartment. Thus, efficient interchange of the ions and the liquid in the depleting compartment with the ions in the beads to effect ion removal from the liquid in the depleting compartment is attained. Furthermore, it has been found that by controlling the geometry of the subcompartment as set forth herein and the use of multiple depletion compartments in each stage relatively low energy requirements for the electrodeionization apparatus can be utilized even over long periods to attain desired liquid purity.

Referring to FIG. 1, the electrodeionization apparatus 10 comprises one stage 12 bounded by electrode 9 and electrode 11. The stage 12 includes an end plate 13 having an expandable bladder 15 and an inlet 16 for fluid to expand the bladder 15. Adjacent the endplate 13 is an endblock 17 to house electrode 9 and provide desired manifolding. An electrode spacer 18 is positioned adjacent to the end block 17 and includes a screen 19 which effects turbulent flow of liquid passing through the electrode spacer 18. An ion permeable membrane 20 is sealed to the periphery 21 of electrode spacer 18. Spacers 22 formed of flexible material include a screen 24. The spacers 22 and screen 24 comprise the concentrating compartments of the electrodeionization apparatus of this invention. The depleting compartment structures of this invention comprise an ion permeable membrane 26, a spacer formed of rigid material 28 and an ion permeable membrane 30. The ion permeable membranes 26 and 30 are sealed to the periphery 32 of the spacer 28 on opposite surfaces of the spacer 28. Mixed ion exchange resin beads 34 are housed within a central space which includes ribs (not shown) and are retained therein by the membranes 26 and 30. Liquid to be purified within stage 12 is passed through at least two units comprising spacer 22 and 28 and membranes 26 and 30. The units which comprise spacers 22 and 28 and membranes 26 and 30 are repeated usually between about 5 and 100 times in order to provide reasonable liquid flow through capacity in stage 12. A spacer 38 formed of flexible material and screen 24 plus an ion exchange membrane 40 from the end concentrating compartment. An electrode spacer 42 is positioned adjacent the end plate 44 and electrode 11. End plate 50 is provided with flexible bladder 52 which is inflated by fluid passing through conduit 54. Bolts 56, 58 and 60 as well as a fourth bolt (not shown) extend along the entire length of the apparatus 10 to retain the apparatus elements in place.

Figure 2:
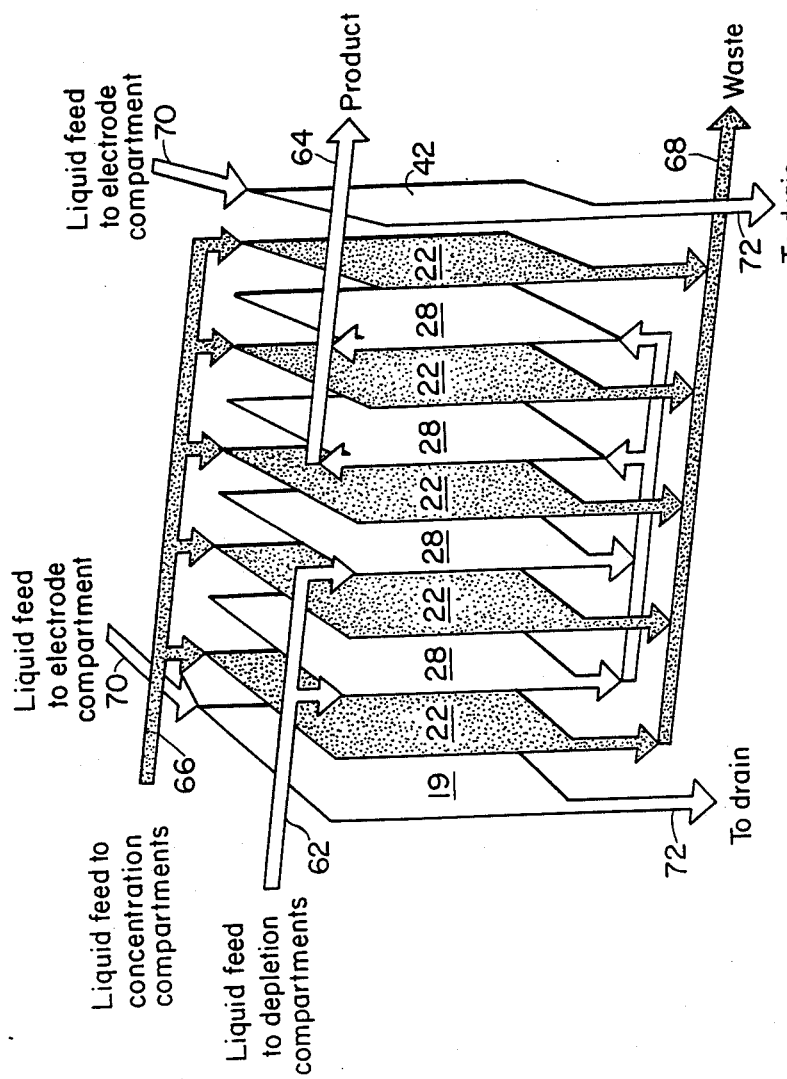
FIG. 2 is a schematic view illustrating the operation of the apparatus of this invention.

Referring to FIG. 2, the flowpaths of the liquids in the various compartments are explained. Liquid to be purified enter inlet 62, passes through depletion compartments 28, is then passed through a second depletion compartment 28 flowing in the compartment 28 and is recovered from outlet 64. It is to be understood that liquid flow through the depletion compartments can be in one direction in each stage. Also, the liquid can be made to flow through more than two depletion compartments in each stage. In addition, the liquid effluent from a depletion compartment can be split into multiple stream and then passed through a second set of depletion compartments. Concentrating liquid is passed through inlet 66 through concentrating compartments 22 and thence through outlet 68 to drain. Liquid electrolyte is circulated through electrode compartments 19 and 42 from inlets 70 and is discarded to drain through outlets 72.

Figure 3:
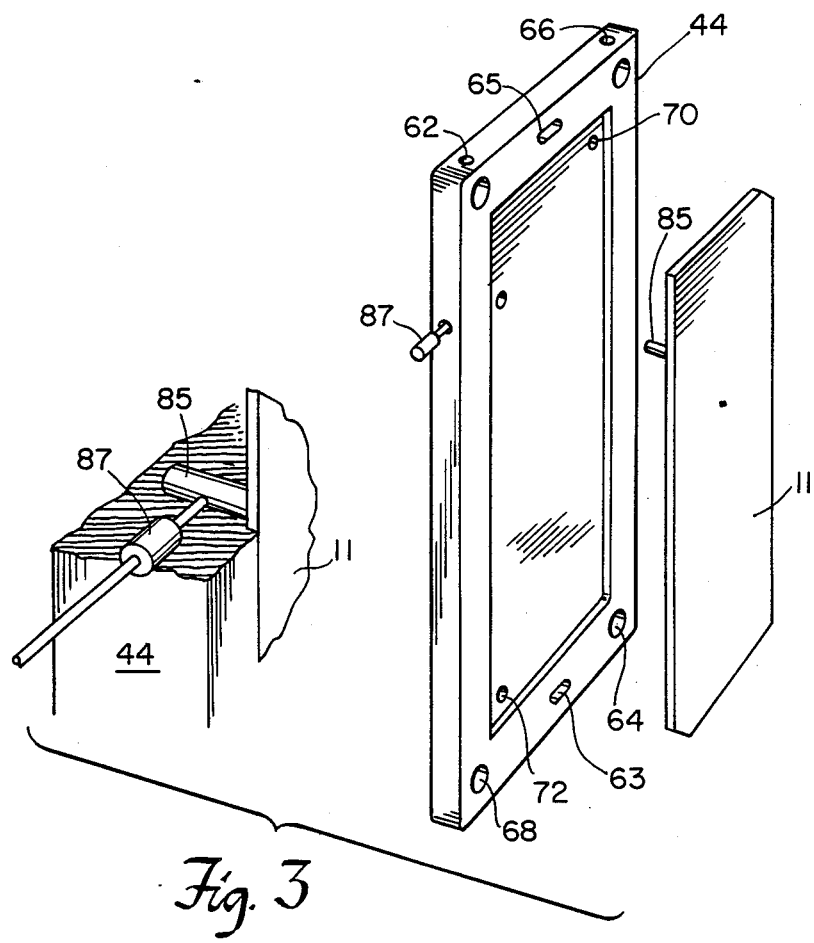
FIG. 3 is a pictorial view of an electrode structure useful in the apparatus of this invention.

Referring to FIG. 3, the electrode structure is shown which comprises a rigid block 44 and an electrode 11. The block 44 is provided with electrolyte feed inlet 70 and electrolyte waste outlet 72. Electrode 11 includes a connector 85 which contacts the exterior electrical connection 87 as shown in the detail portion of FIG. 3. The block 44 includes an inlet 62 and outlet 64 for depletion compartments and inlets 65 and 66 and outlets 63 and 68 for concentration compartments.

Figure 4:
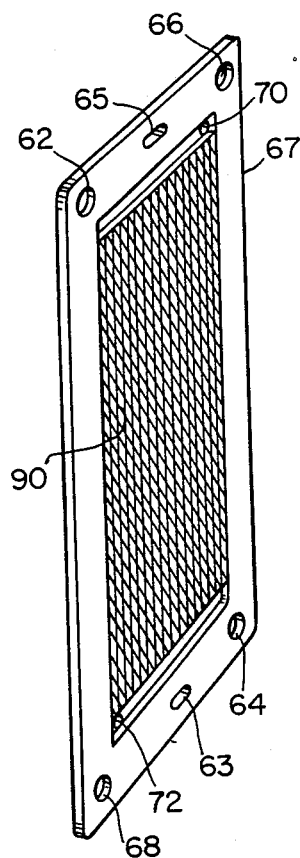
FIG. 4 is a pictorial view of a spacer construction positioned adjacent an electrode of the apparatus of this invention.

Referring to FIG. 4, the electrode spacer 67 includes electrolyte inlet 70 and electrolyte outlet 72 and a screen 90 for effecting turbulence of liquid passing therethrough.

Figure 5:
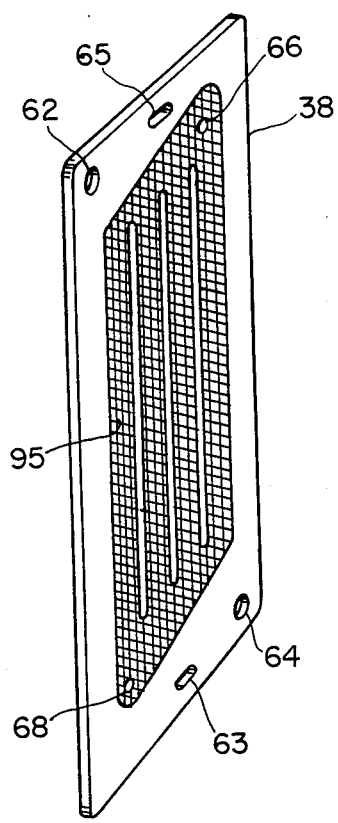
FIG. 5 is a pictorial view of a flexible spacer construction which includes the concentration chambers of the apparatus of this invention.

Referring to FIG. 5, the spacer formed of flexible material, e.g. spacer 38, includes a liquid inlet 66 and a liquid outlet 68 which provide liquid communication to the interior of spacer 38 in which is positioned a screen 95 in order to effect turbulent liquid flow. The outlet 64 permits passage of liquid into the adjacent depleting compartments and inlet 62 permits liquid removal from the adjacent depleting compartments without admixture of the purified liquid with the liquid in the concentrating compartment formed in spacer 38.

Figure 6:
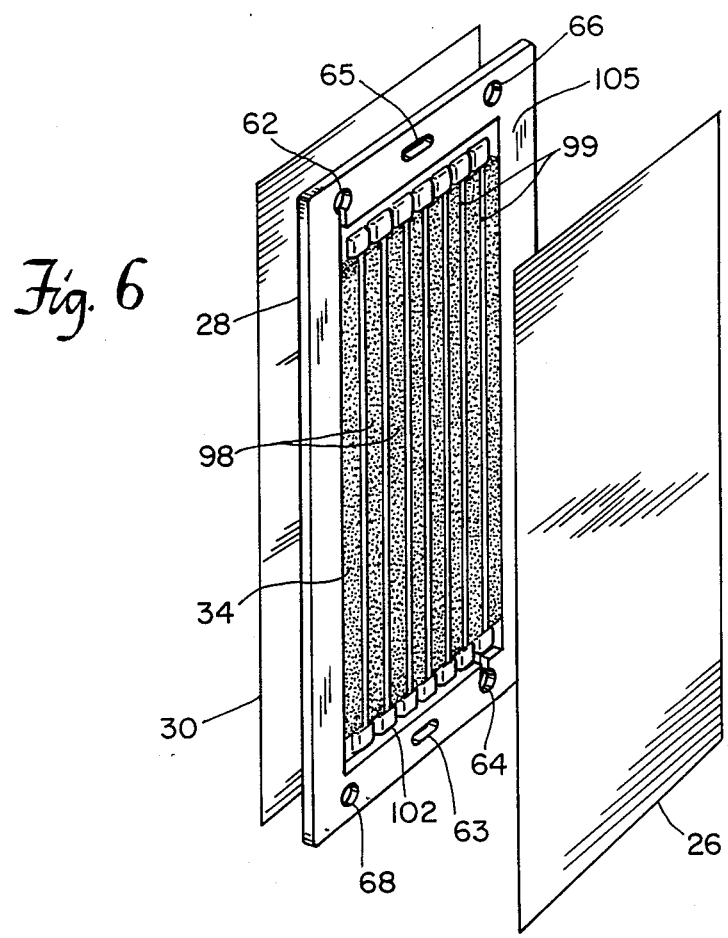
FIG. 6 is a pictorial view showing the depletion chambers of the apparatus of this invention.
Figure 7:
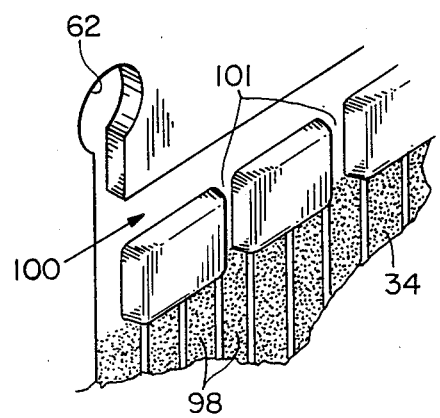
FIG. 7 is a detailed view of the liquid inlet means to the structure of FIG. 6.

Referring to FIGS. 6 and 7, the structure of the depleting compartments of this invention is shown in detail. The depleting compartment comprises a rigid spacer, e.g. spacer 28, and an anion permeable membrane 30 and cation membrane 26. The ion exchange materials 34 are housed within subcompartments formed by the membranes 26 and 30, the wall 105 and the ribs 99. The membranes 26 and 30 are sealed along their entire length to wall 105 and ribs 99. The membranes 26 and 30 are also sealed to the periphery of the rigid spacer 28 so that the individual subcompartments 98 are effectively isolated from each other. Liquid to be purified enters inlets 101 and into the subcompartments 98 wherein they are subjected to an electrical voltage in order to pass anions through membrane 30 and cations through membrane 26. The purified liquid then passes through outlets 102 and spacer outlet 64 wherein it is collected in accordance with the explanation of FIG. 2.

In one aspect of this invention, the liquid to be purified can be pretreated prior to the electrodeionization to remove specific contaminants such as organics. A softener-scavenger system can be employed wherein the softener can include a cation exchange resin and/or an anion exchange resin to remove specific ions. The scavenger can comprise an anion exchange resin in order to remove foulants that foul the anion resin such as organics, including tannins, humic acids, fulvic acids and lignins. The ion exchange resins can be regenerated with brine (NaCL) efficiently and simply.

Any anion membrane or cation permeable membrane having the strength to withstand the operating pressure differential, typically up to about 5 psi, can be utilized in the present invention. It should be pointed out that sealing of the membranes to the ribs forming the subcompartments permits the use of higher operating pressures and enhances the apparatus of the prior art since the assembly strength is thereby increased. Representative suitable anion permeable membranes include a homogeneous type web supported styrene-divinylbenzene based with sulfonic acid or quarternary ammonium functional groups sold under the identifications CR61-CZL-386 and AR 103-QZL-386 by Ionics Inc.; a heterogeneous type web supported using styrene-divinylbenzene based resins in a polyvinylidene fluoride binder sold under the identifications MC-3470 and MA-3475 by Sybron-Ionac; homogeneous type unsupported sulfonated styrene and quarternized vinylbenzylamine grafts of polyethtlene sheet sold under the name, Raipore by RAI Research Corporation; a homogeneous type web supported styrene-divinylbenzene based with sulfonic acid or quarternary ammonium functional groups sold under the name Neosepta by Tokuyama Soda Co. Ltd.; a homogeneous type web supported styrene-divinylbenzene based with sulfonic acid or quarternary ammonium groups sold under the name Aciplex by Asahi Chemical Industry Co. Ltd.

The following example illustrates the present invention and is not intended to limit the same.

EXAMPLE 1

This example illustrate the improved separation efficiency obtained with the electrodeionization apparatus of this invention utilizing multiple passes through depletion compartments in a separation stage as compared to an electrodeionization apparatus utilizing a single pass through a depletion compartment in a separation stage.

Two separation stacks were assembled for the comparative testing. The first stack contained two 26-inch long dilute cells arranged in parallel and sandwiched between one concentrate spacer and a pair of electrode spacers and electrodes (see FIG. 8). Two diluting cells were used in parallel to help minimize possible error. The second stack contained four 13-inch long dilute cells arranged to obtain two parallel two pass configurations (see FIG. 9). The three concentrate spacers were arranged for parallel flow and the cells were bound by electrode spacers and electrodes.

New membranes and new ion exchange resins were used in both stack assemblies. The two stacks were run simultaneously on the same liquid feed and with the same type power supplies. Data was collected at approximately the same time. Four series of tests were made and the test conditions are described under each series.

SERIES A TESTS

Test conditions: Feed 295 umho sodium chloride, temperatue 18° C., power source Condor 9 Volt, 1 Amp calculator battery charger (non-variable).

$D_1$ denotes dilute from 26-inch long flow path;

$C_1$ denotes concentrate from 26-inch long flow path.

$D_2$ and $C_2$ denote dilute and concentrate from 13-inch long flow path and $I_1$; $I_2$; $E_1$, $E_2$ denote amperage and voltage respectively.

The percent water recovery is expressed as $R_1$ and $R_2$.

TEST I

The feed flow rate into each stack was adjusted at 400 ml/min and at steady operation the pertinent parameter were: $I_1=0.9A$; $E_1=9.4V$; $D_1=11.2$ umhos; $C_1=580$ umhos; $R_1=67\%$ $I_2=0.47A$; $E_2=11.2V$; $D_2=1.5$ umhos; $C_2=1220$ umhos; $R_2=67\%$ $D_2$ exceeds $D_1$ water quality by 7.5X.

TEST II

Same as Test I with feed flow adjusted to 300 ml/min and at steady operation the pertinent parameters were: $I_1=0.73A$; $E_1=9.7V$; $D_1=10.0$ umhos; $C_1=600$ umhos; $R_1=67\%$; $I_2=0.43A$; $E_2=11.4V$; $D_2=0.5$ umhos; $C_2=1450$ umhos; $R_2=77\%$ $D_2$ exceeds $D_1$ water quality by 20X.

TEST III

Same as Test I at a feed flow rate adjusted to 500 ml/min to each stack and at a steady operation the pertinent parameters were: $I_1=1.09A$; $E_1=8.7V$; $D_1=15.5$ umhos; $C_1=600$ umhos; $R_1=68\%$ $I_2=0.55A$; $E_2=10.8V$; $D_2=2.9$ umhos; $C_2=1300$ umhos; $R_2=80\%$ $D_2$ exceeds $D_1$ water quality by 5X.

SERIES B TESTS

Test conditions: same as Series A but with a condor 12 volt$^2$, Amp calculator battery charger (non-variable).

TEST IV

The feed flowrate into each stack was adjusted to 500 ml/min and at steady operation the pertinent parameters were: $I_1=1.21A$; $E_1=10.2V$; $D_1=14.0$ umhos; $C_1=535$ umhos; $R_1=68\%$ $I_2=0.640$; $E_2=13.6V$; $D_2=0.65$ umhos; $C_2=1350$ umhos; $R_2=78\%$ $D_2$ exceeds $D_1$ water quality by 21.5X.

TEST V

Same as Test IV at a feed flow rate to each stack adjusted to 400 ml/min and a steady operation the pertinent parameters were: $I_1=1.1A$; $E_1=12.7V$; $D_1=10.5$ umhos; $C_1=600$ umhos; $R_1=68\%$ $I_2=0.59A$; $E_2=13.9V$; $D_2=0.3$ umhos; $C_2=1350$ umhos; $R_2=78\%$ $D_2$ exceeds $D_1$ water quality by 35X.

SERIES C TESTS

Test conditions: Feed 225 umhos mixture of sodium chloride and sodium bicarbonate at approximately the same milligrams per liter; temperature 18° C.; power source 9 Volts, 1 Amp supply used in Series A tests.

TEST VI stream normally results in an increase in back diffusions which was not reflected in these tests.

TABLE I

| Test No. | Flow ml/min | Amperage $I_1$ | Amperage $I_2$ | Voltage $E_1$ | Voltage $E_2$ | umhos Dilute $D_1$ | umhos Dilute $D_2$ | umhos Concentration $C_1$ | umhos Concentration $C_2$ | % Recovery $R_1$ | % Recovery $R_2$ | Feed |
|---|---|---|---|---|---|---|---|---|---|---|---|---|
| 1 | 400 | 0.90 | 0.47 | 9.4 | 11.2 | 11.2 | 1.5 | 580 | 1220 | 67 | 67 | 295 umho NaCl |
| 2 | 300 | 0.73 | 0.43 | 9.7 | 11.4 | 10.0 | 0.5 | 600 | 1450 | 67 | 77 | 295 umho NaCl |
| 3 | 500 | 1.09 | 0.55 | 8.7 | 10.8 | 15.5 | 2.9 | 600 | 1300 | 68 | 80 | 295 umho NaCl |
| 4 | 500 | 1.21 | 0.64 | 10.2 | 13.6 | 14.0 | 0.65 | 535 | 1350 | 68 | 78 | 295 umho NaCl |
| 5 | 400 | 1.10 | 0.59 | 12.7 | 13.9 | 10.5 | 0.30 | 600 | 1350 | 68 | 76 | 295 umho NaCl |
| 6 | 400 | 0.81 | 0.46 | 10.0 | 11.4 | 6.5 | 0.24 | 450 | 1100 | 68 | 77 | 225 umho |

The feed flow rate to each stack was adjusted to 400 ml/min and at steady operation the pertinent parameters were: $I_1=0.81A$; $E_1=10.0V$; $D_1=6.5$ umhos; $C_1=450$ umhos; $R_1=68\%$ $I_2=0.46A$; $E_2=11.4V$; $D_2=0.24$ umhos; $C_2=1100$ umhos; $R_2=77\%$ $D_2$ exceeds $D_1$ water quality by 27X.

TEST VII

Same as Test VI at a feed flow rate to each stack adjusted to 500 ml/min and a steady operation the pertinent parameters were: $I_1=0.91A$; $E_1=9.6V$; $D_1=9.0$ umhos; $C_1=485$ umhos; $R_1=72\%$ $I_2=0.50A$; $E_2=11.3V$; $D_2=1.65$ umhos; $C_2=1000$ umhos; $R_2=78\%$ $D_2$ exceeds $D_1$ water quality by 5.5X.

TEST VIII

Same as Test VI at a feed flow rate to each stack adjusted to 300 ml/min and at steady operation the pertinent parameters were: $I_1=0.70A$; $E_1=10.4V$; $D_1=8.0$ umhos; $C_1=500$ umhos; $R_1=67\%$ $I_2=0.41A$; $E_2=11.6V$; $D_2=0.22$ umhos; $C_2=1100$ umhos; $R_2=77\%$ $D_2$ exceeds $D_1$ water quality by 36X.

SERIES D TESTS

Test conditions: Same feed as in Series C; power source was changed to two similar variable supplies.

TEST IX

Feed flow rate to each stack was adjusted to 400 ml/min and the applied cell pair voltage was set at 2 volts per cell pair plus 3 volts for the electrode voltage. At steady operation the pertinent parameters were: $I_1=0.64A$; $E_1=7.0V$; $D_1=16.0$ umhos; $C_1=440$ umhos; $R_1=65\%$ $I_2=0.41A$; $E_2=11.0V$; $D_2=1.60$ umhos; $C_2=850$ umhos; $R_2=74\%$ $D_2$ exceeds $D_1$ water quality by 10X.

TEST X

Same as Example IX at 3 volts per cell pair. At steady operation the pertinent parameters were: $I_1=0.75A$; $E_1=9.0V$; $D_1=9.0$ umhos; $C_1=500$ umhos; $R_1=65\%$ $I_2=0.52A$; $E_2=15.0V$; $D_2=0.70$ umhos; $C_2=980$ umhos; $R_2=74\%$ $D_2$ exceeds $D_1$ water quality by 13X.

In all ten comparative tests with varying feed flows, varying applied power and feed mixtures the 13-inch two pass stack exceeded the performance of the 26-inch single pass stack. The performance of the 13-inch two pass stack was better than the single 26-inch stack although the water recovery in 9 of the 10 tests was higher which resulted in a higher conductivity concentrate stream. The higher conductivity concentrate

I claim:
1. Electrodeionization apparatus adapted to remove ions from a liquid which comprises:
   at least one separation stage comprising,
   a cathode compartment at a first end of said stage,
   an anode compartment at an end of said stage opposite said first end,
   a plurality of alternating ion depletion compartments and ion concentration compartments, said depletion compartments being connected in series, said depletion compartments and concentration compartments being positioned between said cathode compartment and said anode compartment,
   each of said ion depletion compartments comprising a spacer and a plurality of subcompartments formed by a plurality of ribs extending along the length of each of said ion depletion compartments,
   each of said subcompartments containing a mixture of anion exchange resin and cation exchange resin,
   each of said subcompartments having a width defined by the distance between said ribs of between about 0.3 and 4 inches and a thickness between about 0.05 and 0.25 inches and wherein the thickness of said subcompartments is defined by the distance between an anion permeable membrane and a cation permeable membrane being bonded to each of said ribs, along the length of said ribs, and to said spacer,
   each of said concentration compartments being free of ion exchange solid composition,
   means for passing a first liquid to be purified through at least two of said ion depletion compartments in series in said stage,
   means for passing a second liquid for accepting ions from said first liquid through said concentration compartments,
   means for applying an electrical voltage between an anode in said anode compartment and a cathode in said compartment and,
   means for recovering purified liquid from said depletion compartments.

2. The apparatus of claim 1 wherein the width of said subcompartments is between about 0.5 and 1.5 inches.

3. The apparatus of claim 1 wherein the thickness of said subcompartment is between about 0.06 and 0.125 inches.

4. The apparatus of any of claims 1, 2 or 3 which includes means in said concentration compartments for effecting turbulent flow of said second liquid.

5. The apparatus of any one of claims 1, 2 or 3 wherein the volume ratio of the anion exchange resin to the cation exchange resin in said ion depletion compartments is between about 2.0 and 0.5.

6. Electrodeionization apparatus adapted to remove ions from a liquid which comprises a plurality of separation stages, each stage comprising:
- a cathode compartment at a first end of each of said stage,
- an anode compartment at an end of each of said stages opposite said first end,
- a plurality of alternating ion depletion compartments and ion concentrations compartments, said depletion compartments being connected in series, said depletion compartments and concentration compartments being positioned between said cathode compartment and said anode compartment to define a stage,
- each of said ion depletion compartments comprising a spacer and a plurality of ribs extending along the length of each of said ion depletion compartments,
- each of said subcompartments containing a mixture of anion exchange resin and cation exchange resin, each of said subcompartments having a width defined by the distance between said ribs of between about 0.3 and 4 inches and a thickness between about 0.05 and 0.25 inches and wherein the thickness of said subcompartments is defined by the distance between an anion permeable membrane and a cation permeable membrane, said membranes being bonded to each of said ribs along the length of said ribs and to said spacer,
- each of said concentration compartments being free of ion exchange resin solid composition,
- means for passing a first liquid to be purified through at least two of said ion depletion compartments in series in each of said stages,
- means for passing a second liquid for accepting ions from said first liquid, through said concentration compartments,
- means for applying an electrical voltage between an anode in said anode compartment and a cathode in said cathode compartment and,
- means for recovering purified liquid from said depletion compartments.

7. The apparatus of claim 6 wherein the width of said subcompartments is about 0.5 and 1.5 inches.

8. The apparatus of claim 6 wherein the thickness of said subcompartment is between about 0.06 and 0.125 inches.

9. The apparatus of any one of claims 6, 7 or 8 which includes means in said concentration compartments for effecting turbulent flow of said second liquid.

10. The apparatus of any one of claims 6, 7 or 8 wherein the volume ratio of the anion exchange resin to the cation exchange resin in said depletion compartments is between about 2.0 and 0.5.

* * * * *

UNITED STATES PATENT AND TRADEMARK OFFICE
CERTIFICATE OF CORRECTION

PATENT NO. : 4,931,160

DATED : 06-05-90

INVENTOR(S) : Giuffrida, et. al.

It is certified that error appears in the above-identified patent and that said Letters Patent is hereby corrected as shown below:

On the title page, insert the following:

[*] Notice: The portion of the term of this patent subsequent to December 30, 2003, has been disclaimed.

Signed and Sealed this

Thirty-first Day of March, 1992

Attest:

HARRY F. MANBECK, JR.

*Attesting Officer*  *Commissioner of Patents and Trademarks*